United States Patent [19]
Brunton

[11] 3,793,878
[45] Feb. 26, 1974

[54] LOAD SENSORS
[75] Inventor: John David Brunton, Denham, England
[73] Assignee: Taylor Woodrow Construction Limited, Southall, Middlesex, England
[22] Filed: Apr. 5, 1972
[21] Appl. No.: 241,210

[30] Foreign Application Priority Data
Apr. 7, 1971  Great Britain ..................... 9000/71

[52] U.S. Cl. ................................. 73/88.5 R, 73/144
[51] Int. Cl. .............................................. G01l 5/04
[58] Field of Search. 73/88.5 R, 141 R, 141 A, 143, 73/144

[56]  References Cited
UNITED STATES PATENTS
2,901,235   8/1959   Bradley ......................... 73/141 A X
3,526,129   9/1970   Anderson ............................. 73/144
2,667,068   1/1954   Viehe et al. ...................... 73/143 X Primary Examiner—Charles A. Ruehl
Attorney, Agent, or Firm—Eric H. Waters

[57]  ABSTRACT

A load sensor that can be incorporated in a vessel that is to be circumferentially stressed by winding prestressing filaments or bands under tension around the vessel, the sensor being arranged to be mounted in a suitable cavity formed in the wall of the vessel at a zone such that the mouth of the cavity is bridged by prestressing filaments or bands when these are wound on to the vessel, and the sensor comprising a saddle member and the load sensing means serving, in use, to support the saddle member in the region of the mouth of the cavity such that prestressing filaments or bands bridging the mouth of the cavity apply loading to the saddle, which loading is sensed by the sensing means.

8 Claims, 3 Drawing Figures

LOAD SENSORS

This invention relates to load sensors.

It has previously been proposed (see British Pat. Specification No. 1,054,588 — Taylor Woodrow Construction Limited) to apply circumferential stressing to a concrete pressure vessel by winding prestressing wires under tension around the vessel. Such a vessel will have service life of many years and it is desirable that provision be made for sensing, and measuring, changes that may occur during the life span of the vessel in the loading applied to the vessel by the prestressing wires.

According to the present invention there is provided a load sensor that can be incorporated in a vessel that is to be circumferentially stressed by winding prestressing filaments or bands under tension around the vessel, the sensor being arranged to be mounted in a suitable cavity formed in the wall of the vessel at a zone such that the mouth of the cavity is bridged by prestressing filaments or bands when these are wound on to the vessel, and the sensor comprising a saddle member and load sensing means serving, in use, to support the saddle member in the region of the mouth of the cavity such that prestressing filaments or bands bridging the mouth of the cavity apply loading to the saddle, which loading is sensed by the sensing means.

For a better understanding of the invention and to show how the same may be carried into effect, reference will now be made, by way of example, to the accompanying drawing, in which.

Figure 1:
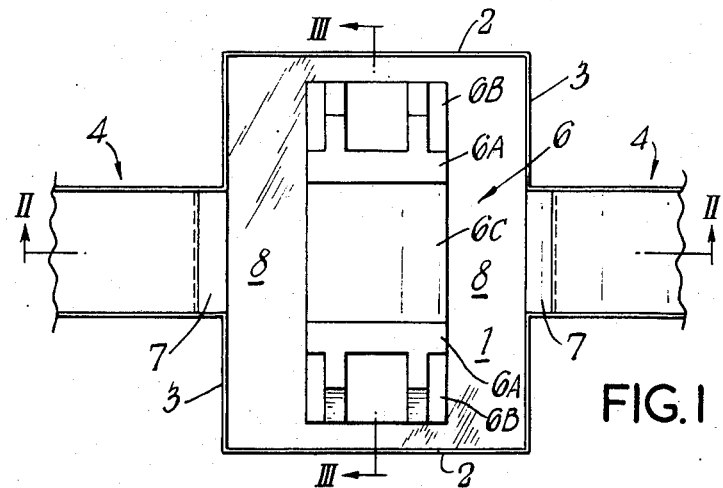
FIG. 1 is a diagrammatic plan view of a load sensor.
Figure 2:
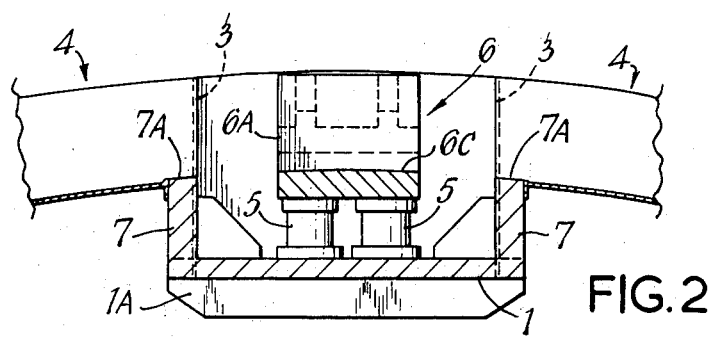
FIGS. 2 and 3 are diagrammatic sectional views respectively taken on the lines II—II and III—III of FIG. 1.

The load sensor of the Figures consists of a base plate 1 having stiffening ribs 1A depending therefrom. Upstanding from the base plate 1 are side walls 2 and end walls 3. Centrally of the end walls 3, at a distance above the base plate 1, wall members defining upwardly-open U-sectioned channels 4 opening each at one end through the end walls 3 extend away from the end walls 3.

Centrally of the base plate 1, four load cells 5 are secured so as to be upstanding. These load cells support between the open ends of the channels 4 a main saddle 6 that has upstanding side walls 6A that extend in planes parallel with the planes in which the side walls of the channels 4 extend. The base plate 1 also carries two sub-saddles 7, 7 that extend up to the channels 4 to form the base of each channel at the entrance thereto. The main saddle 6 is spaced from the sub-saddles 7 so that there is a gap 8 between the main saddle 6 and each sub-saddle 7.

Four load relieving jacks 9 can be removably mounted between side wings 6B of the saddle 6 and the base 1.

The sensor of the Figures is intended for sensing, and measuring, changes of loading in the prestressing applied to a concrete pressure vessel by tensioned wires (or other filaments or bands) wound onto the vessel so as to extend circumferentially of the vessel in prepared channels. To this end a cavity is provided in the vessel through one of the prepared channels and dimensioned such that the sensor can be mounted in this cavity with its base plate 1 supported by the base of the cavity, and with its channels 4 lining the prepared channel in the vessel. Conveniently, during mounting of the sensor in a vessel and whilst the prestressing wires are wound on, the saddle 6 is held in position by set bolts extending into the base 1 and others extending to the corners of the walls 2/3. The bolts extending to the base are removed after a first layer of wires has been wound on. The bolts to the corners are removed after winding is completed. The jacks 9 are not in position at this time.

The dimensions and configuration of the load sensor in relation to the cavity prepared for it are such that when the sensor is positioned in the cavity the main saddle 6 is disposed in the region of the mouth of the cavity with its load bearing face 6C slightly above the pitch circle of the base of the prepared channel, the face 6C being disposed, to this end, slightly above the pitch circle of the bases of the two channels 4. Thus the prestressing wires wound onto the vessel, in the prepared channel, apply loading to the saddle 6. With a view to ensuring that the wires leave the base of the prepared channel and pass over the load bearing face of the main saddle without undue bending or kinking thereof, the load bearing face 6C of the saddle is convex and has a radius that is smaller than the radius of the bases of the channels 4 and hence smaller than the radius of the base of the prepared channel. Accurate geometry is assured by arranging that the sub-saddles 7 have their load bearing faces 7A positioned slightly proud of the pitch circle of the remainder of the bases of the channels 4 and hence of the pitch circle of the base of the prepared channel, these sub-saddles 7 being rigidly connected with the main saddle 6 through the base plate 1. Also the load bearing faces 7A of the sub-saddles 7 are convex.

The main saddle side walls 6A serve to retain the prestressing wires in position.

The size of the base plate 1 is such that the stress produced in the concrete below the plate is the same as that produced below the immediately adjacent sections of the prepared channel.

During the life span of the vessel, the total load on the four load cells can be continuously monitored on a recorder. Since the radial load applied to the main saddle is directly proportional to the tension load in the prestressing wires, a change of reading over any period of time indicates that a change of load has occurred in the prestressing wires.

Figure 3:
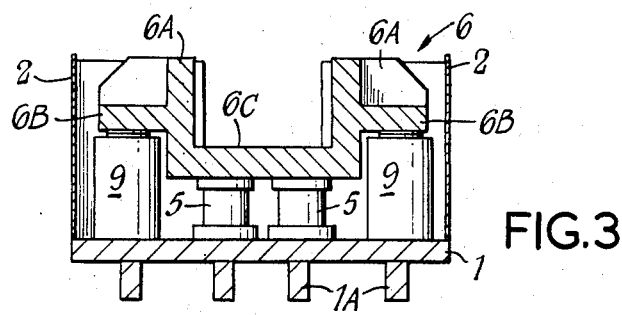

To enable the load cells to be unloaded and then zeroed at any time, the four jacks 9 are placed in position as shown in FIG. 3 and actuated to relieve the load on the load cells. If desired the load cells can be removed for repair or replacement at this time.

In a modification (not shown) provision is made for mounting load-relieving jacks (replacing the jacks 9) above rather than below the saddle 6. To this end, pillars are provided supported from the base plate at the zones at which the jacks 9 are shown in FIG. 3, and there is also provided a pair of saddle extensions that can be temporarily bolted to the top of the main saddle, these saddle extensions having wings that then extend over the pillars so that jacks placed between the pillars and these wings can be actuated to relieve the load on the load cells.

It will be appreciated that as many of the described sensors as desired can be incorporated in any one pressure vessel. Furthermore, less than, or more than, four load cells can be provided.

I claim:

1. A load sensor that can be incorporated in a vessel that is to be circumferentially stressed by winding prestressing filaments or bands under tension around the vessel, the sensor being arranged to be mounted in a suitable cavity formed in the wall of the vessel at a zone such that the mouth of the cavity is bridged by prestressing filaments or bands when these are wound on to the vessel, and the sensor comprising a saddle member; a load sensing means serving, in use, to support the saddle member in the region of the mouth of the cavity such that prestressing filaments or bands bridging the mouth of the cavity apply loading to the saddle member, which loading is sensed by the sensing means; and a base plate having side and end walls upstanding therefrom and, at a distance above the base plate, wall members defining upwardly-open channels opening each at one end through said end walls and extending away from said end walls; the load sensing means supporting the saddle member from the base plate so that the saddle member is disposed between the open ends of said channels.

2. A load sensor as claimed in claim 1, wherein the base plate carries two sub-saddles that extend up to the channels to form the base of each channel at the entrance thereto, the saddle member being spaced from each of these sub-saddles.

3. A load sensor as claimed in claim 2, wherein the load bearing faces of the sub-saddles are positioned slightly proud of the pitch circle of the remainder of the bases of said channels.

4. A load sensor as claimed in claim 3, wherein the load bearing faces of the sub-saddles are convex.

5. A load sensor as claimed in claim 1, wherein the saddle member has upstanding side walls that extend in planes parallel with the planes in which the side walls of said channels extend.

6. A load sensor as claimed in claim 1, wherein the load bearing face of the saddle member is disposed slightly above the pitch circle of the bases of said channels.

7. A load sensor as claimed in claim 1, wherein the saddle member is convex and has a radius smaller than the radius of the bases of said channels.

8. A load sensor as claimed in claim 1, and further comprising removable jacking means for jacking the saddle member to relieve the load sensing means of load.

* * * * *